(12) United States Patent
Suzuki et al.

(10) Patent No.: US 7,529,047 B2
(45) Date of Patent: May 5, 2009

(54) ACTUATOR FOR AN OPTICAL SCANNING DEVICE

(75) Inventors: Tsuneo Suzuki, Moenchweiler (DE); Michael Bammert, Hardt (DE); Rolf Dupper, Villingen-Schwenningen (DE)

(73) Assignee: Thomson Licensing, Boulogne Billancourt (FR)

( * ) Notice: Subject to any disclaimer, the term of this patent is extended or adjusted under 35 U.S.C. 154(b) by 73 days.

(21) Appl. No.: 11/602,831

(22) Filed: Nov. 21, 2006

(65) Prior Publication Data
US 2007/0121226 A1  May 31, 2007

(30) Foreign Application Priority Data
Nov. 25, 2005 (EP) .................................. 05111328

(51) Int. Cl.
*G02B 7/02* (2006.01)
(52) U.S. Cl. ........................................ 359/824; 359/814
(58) Field of Classification Search ......... 359/811–814, 359/823, 824; 369/44.12, 44.14, 44.16, 244
See application file for complete search history.

(56) References Cited
U.S. PATENT DOCUMENTS

| | | | |
|---|---|---|---|
| 5,600,619 A | 2/1997 | Takekoshi et al. ........... 369/112 |
| 5,666,235 A | 9/1997 | Izuka et al. .................. 359/814 |
| 2001/0026406 A1 | 10/2001 | Ijima et al. .................. 359/824 |
| 2001/0028515 A1 | 10/2001 | Kawano ..................... 359/822 |
| 2004/0187144 A1* | 9/2004 | Jang et al. ................... 720/683 |

OTHER PUBLICATIONS

Search Report dated Jul. 13, 2006.
European Search Report Attached.

* cited by examiner

*Primary Examiner*—Mohammed Hasan
(74) *Attorney, Agent, or Firm*—Robert D. Shedd; Jeffrey M. Navon; Robert B. Levy

(57) ABSTRACT

Actuator for an optical scanning device, having a focus lens mounted in a lens holder and having a damper base firmly connected to a mount, having a magnet arrangement arranged on the mount, and a coil arrangement interacting with the magnet arrangement, on a printed circuit board, for fine positioning of the focus lens, with the printed circuit board being connected to the damper base by means of elastically flexible suspension means arranged on both sides of the longitudinal axis of the actuator. It achieves the object of designing an actuator such as this in such a way that it has a reduced moment of inertia, because of a reduced mass. For this purpose, the printed circuit board is at the same time a mounting board for the lens holder, and the printed circuit board and the lens holder together form the moving part of the actuator.

10 Claims, 2 Drawing Sheets

ACTUATOR FOR AN OPTICAL SCANNING DEVICE

This application claims the benefit, under 35 U.S.C. § 119 of EP Patent Application 05111328.0 filed 25 Nov. 2005.

FIELD OF THE INVENTION

The invention relates to an actuator for an optical scanning device for scanning optical disks, in particular for an appliance for recording or for reproduction, or for recording and reproduction, of information.

BACKGROUND OF THE INVENTION

An actuator which is integrated in a scanning device is used for emission of a light beam (laser beam) onto an optical disk in the form of an information storage medium, and for reception of the beam reflected from it. For this purpose, the actuator has a focus lens and is attached, such that it can be adjusted, by means of a mount to an optical housing, which is also known as pick-up and can be moved on guide rails, in order to allow the focus lens to be aligned with the optical path of the housing. This housing and thus the entire scanning device can be moved at high speed and with high positioning accuracy, driven by one or more electric motors, and ensures short access times to different points on the recording medium. In this case, the scanning device focuses a radiation beam, in order to form a radiation point, on a track that is to be scanned on the disk. This radiation point follows the track on the rotating disk during recording or reproduction. This is done with the aid of a track control system, which allows coarse control of the slide-like housing and of the actuator in a radial direction with respect to the disk, and allows fine control of the actuator. This fine control is required in order to keep the distance between the focus lens and the optical disk constant, and in order to ensure precise tracking of the projected light beam, since the disk normally has an unavoidable eccentricity error, which leads to inadvertent oscillations during operation which would themselves lead to reproduction errors, without fine control.

The actuator is preferably attached to the optical housing by means of a mounting board and has a lens holder for the focus lens, a damper base, which is fixed to the mounting board, for the lens holder, and focus coils which interact with a magnet arrangement, tracking coils and, possibly, also tilt coils, with the lens holder being connected in an elastically sprung manner to the damper base via elastically flexible suspension means, in particular also wires. In order to reduce the mass of the actuator, so that its moment of inertia is less and it can be controlled more sensitively and quickly, the coils may be arranged as printed coils on a printed circuit board (coil printed circuit board), which is connected to the lens holder.

An actuator with a plastic lens holder is described in JP-A-2003-346361. In this case, the magnet arrangement is arranged on only one side of a coil printed circuit board, on which focus and tracking coils are printed, and is thus positioned such that the coils are in the magnetic field. This coil printed circuit board, the lens holder and a so-called substrate holder composed of metal for the coil printed circuit board are positioned next to one another and are connected to one another by means of a large number of projections, which are arranged on the substrate holder, and form the moving parts of the actuator. This means that the substrate holder composed of metal is also moved as a component of the moving part.

US-A-2002/0075575 also discloses, in the description of the prior art, an actuator having a coil printed circuit board. In this case, the coil printed circuit board is arranged between two magnets, and the focus lens is positioned with a part of a lens holder, which is connected to the coil printed circuit board, in the area between the damper base and the coil and magnet arrangement. The other part of the lens holder surrounds the coil and magnet arrangement on the side facing away from the focus lens, and, together with the focus lens, forms the moving part of the actuator. The lens holder thus has a considerable mass and a correspondingly high moment of inertia.

SUMMARY OF THE INVENTION

The object of the invention is to design an actuator for an optical scanning device according to the preamble of Claim 1 such that it has a reduced moment of inertia as a result of having a reduced mass.

In the case of an actuator according to the preamble of Claim 1, this object is achieved by the characterizing features of this claim. Advantageous refinements are specified in the dependent claims.

The invention consists in that, in the case of an actuator for an optical scanning device which, in a known manner, has a focus lens mounted in a lens holder, and a damper base which is firmly connected to a mount for arrangement on the optical housing of the scanning device, and which is provided with a magnet arrangement arranged on the mount, and with a coil arrangement interacting with the magnet arrangement, on a printed circuit board for fine positioning of the focus lens, with the printed circuit board being connected to the damper base by means of elastically flexible suspension means arranged on both sides of the coil arrangement and of the longitudinal axis of the actuator, the printed circuit board is at the same time the mounting board for the lens holder and, together with it, forms the moving part of the actuator. This results in a compact actuator for an optical scanning device which has only a small moving mass, formed from the printed circuit board and the lens holder, which is arranged on it, with the focus lens, and this leads to advantageously higher sensitivity and speed for fine control of the focus lens. Furthermore, the actuator is of simple design and requires only a small number of components, so that its installation is also simplified and made easier. The lens holder itself may be designed to be very small since the printed circuit board supports it and also provides the suspension, and since the lens holder does not surround the magnet arrangement.

The printed circuit board is preferably arranged transversely with respect to the longitudinal axis of the actuator and is firmly connected, in particular soldered, to the suspension means which are arranged on both sides of the longitudinal axis of the actuator. In this case, the actuator is symmetrical, with the focus lens being arranged on that side of the printed circuit board which faces away from the damper base, and thus at the front end of the actuator, and, when the scanning device is being used to scan an optical disk, moves with the optical housing in the radial direction with respect to the optical disk, towards and away from this disk.

The printed circuit board must have a defined initial position parallel to the magnet arrangement. A compensating mass is attached to the printed circuit board, on the side which faces away from the focus lens and faces the damper base. This is advantageously integrally formed on the lens holder and is thus mounted at the same time as it on the printed circuit board, thus avoiding additional assembly effort.

The printed circuit board itself is preferably a single-layer or two-layer printed circuit board, on which the focus and tracking coils are arranged in a known manner, whose drive and excitation in the magnetic field of the permanent magnets lead to corresponding fine movement of the printed circuit board and of the connected lens holder with the focus lens. In order to increase the sensitivity, two permanent magnets are provided in each case on both sides of the printed circuit board.

BRIEF DESCRIPTION OF THE DRAWINGS

The invention will be explained in the following text with reference to one exemplary embodiment. In the associated drawings.

DETAILED DESCRIPTION OF PREFERRED EMBODIMENTS

Figure 1:
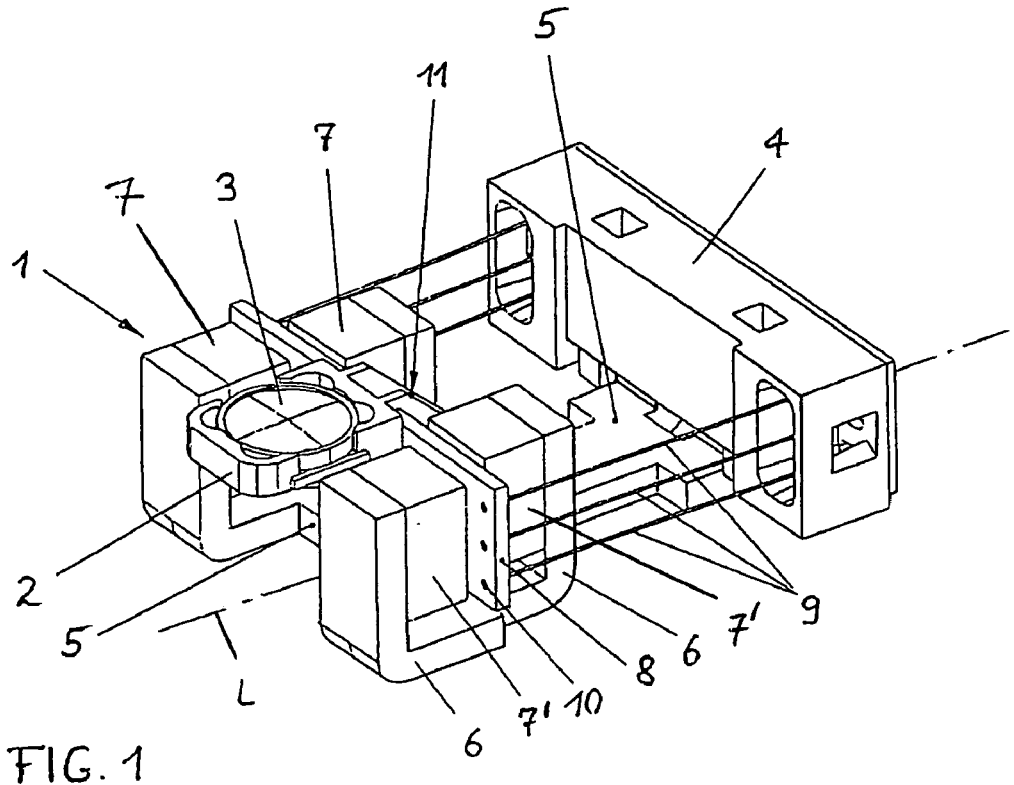
FIG. 1 shows a perspective illustration of an actuator.

The actuator 1, which is illustrated in FIG. 1, as a component of an optical scanning device, which is not illustrated in any more detail, for scanning of an optical disk has a focus lens 3, which is mounted in the lens holder 2 composed of plastic, and a damper base 4. The damper base 4 is firmly connected to a mounting board 5. A yoke 6 is formed on the mounting board 5 and four permanent magnets 7, 7' are attached in a symmetrical arrangement to it, of which in each case two permanent magnets 7, 7' are arranged at a distance from one another and at a distance from an axis of symmetry which runs parallel to the longitudinal axis L of the actuator. A coil printed circuit board 8 with focus and tracking coils printed on it, although these are not illustrated, is held such that it can move between the permanent magnets 7, 7' which are on the damper-base side and those which are further away from the damper base 4. For this purpose, the coil printed circuit board 8 is connected to the damper base 4 by means of elastically flexible suspension wires 9, which are arranged on both sides of the longitudinal axis L, with the suspension wires 9 being soldered to the coil printed circuit board 8 in metallized holes 10. The coil printed circuit board 8 is in this case fitted with the lens holder 2, which is positioned at the front end of the actuator 1 and in the area between the two permanent magnets 7, 7' which are further away from the damper base 1, and is provided with a compensating mass 11 which projects, on the side of the coil printed circuit board 8 which faces the damper base 4, into the intermediate space which is produced between the permanent magnets 7, 7' on the damper-base side.

Figure 2:
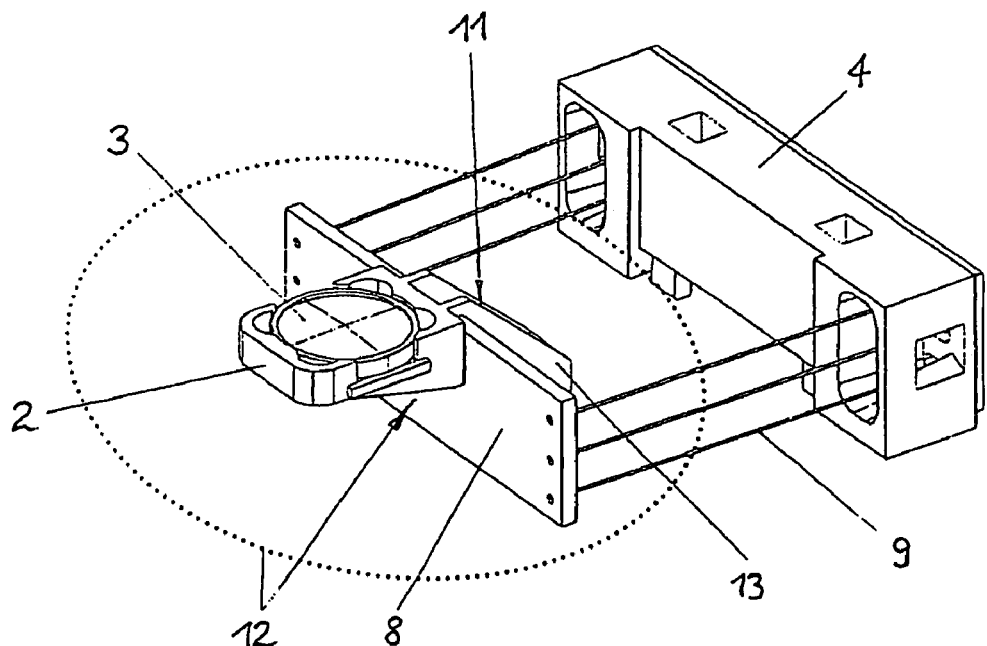
FIG. 2 shows the moving part of the actuator.

FIG. 2 shows the coil printed circuit board 8 with the suspension wires 9 attached to the damper base 4, and with the lens holder 2 with the focus lens 3 inserted into it, with the lens holder 2 being connected to the coil printed circuit 8 to form an assembly unit 12. The figure also shows the compensating mass 11 which is situated on the side of the coil printed circuit board 8 facing the damper base 4, and is formed by an attachment 13 on the lens holder 2. The assembly unit 12 is the moving part of the actuator 1, which is finely positioned by the coil and magnet arrangement during a reading or writing process.

Figure 3:
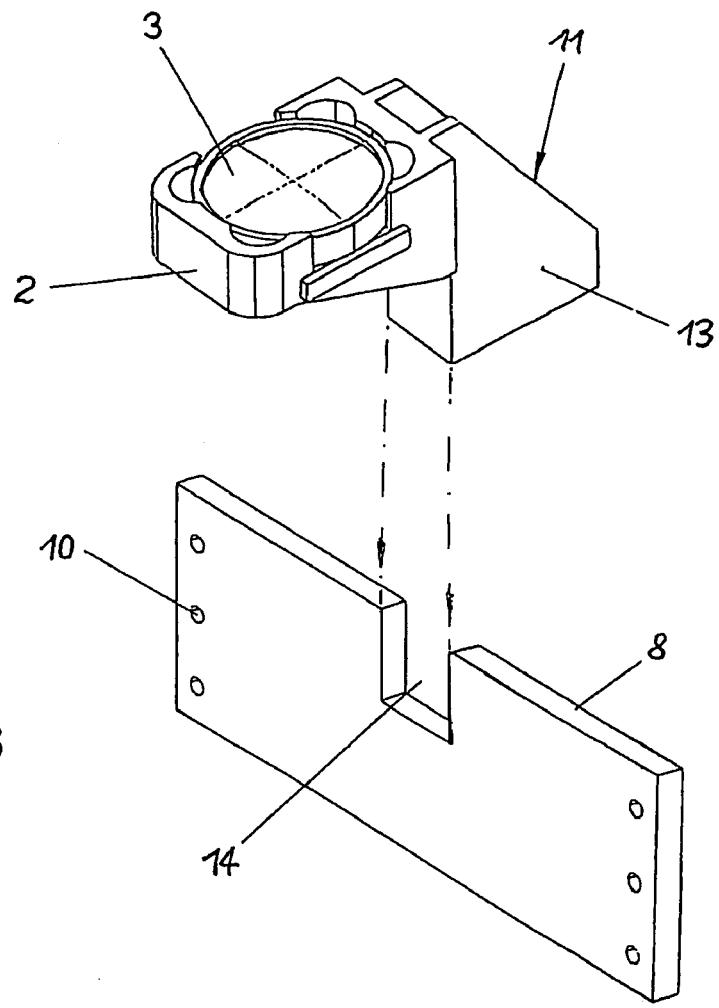
FIG. 3 shows the printed circuit board, which also forms the actuator, and the lens holder in the form of an exploded illustration, enlarged in comparison to FIGS. 1 and 2.
Figure 4:
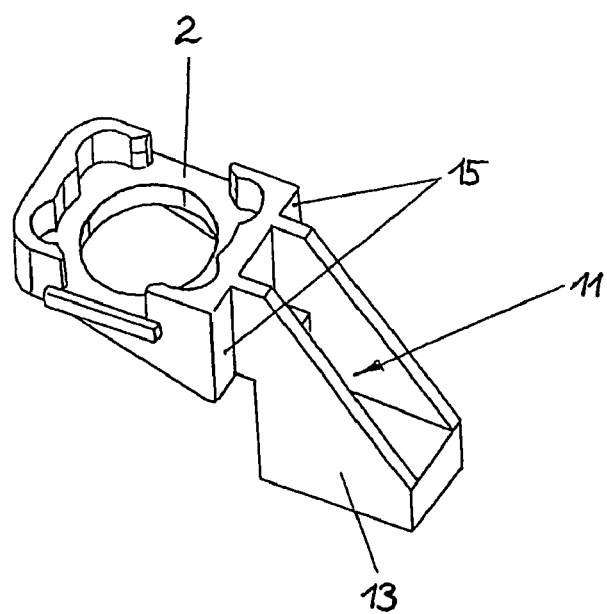
FIG. 4 shows the lens holder in a further perspective view.

FIGS. 3 and 4 illustrate the configuration of the lens holder 3 with the compensating mass 11 integrally formed on the latter, as well as its connection to the coil printed circuit board 8. The width of the attachment 13 corresponds to the width of a recess 14 in the coil printed circuit board 8. The attachment 13 on the lens holder 2 is inserted, such that it fits, into the recess 14 and is adhesively bonded, two contact shoulders 15 next to the recess 14 resting on the coil printed circuit board 8, thus providing a defined arrangement position. A compensating mass 11 of reasonable size can be used to ensure that the centre of mass (centre of gravity) of the entire moving arrangement comprising the printed circuit board 8 and the lens holder 2 lies on the same plane as the printed circuit board 8, particularly preferably at its geometric centre point. In this case, when forces act on the coils which are located on the printed circuit board 8, no undesirable torques occur, which could cause undesirable rotational oscillations of the assembly unit 12.

An alternative exemplary embodiment to the arrangement as shown in FIGS. 1 to 3, of the actuator 1 comprising the printed circuit board 8 and the lens holder 2, arranged centrally in front of or behind it, and the compensating mass 11 is for the lens holder 2 with the focus lens 3 to be attached to one end of the coil printed circuit board 8, in the vicinity of the group of suspension wires 9 that are attached there, and thus at a lateral distance from the longitudinal axis L of the actuator 1; and for a compensating mass 11, which is formed separately, to be attached to the other end of the coil printed circuit board 8, in the vicinity of the other group of suspension wires 9 which are attached there. An arrangement such as this advantageously allows the focus lens 3 to be positioned particularly close to the centre of an optical disk that is to be scanned.

What is claimed is:

1. An actuator for an optical scanning device, having a focus lens mounted in a lens holder and having a damper base which is firmly connected to a mount, having a magnet arrangement arranged on the mount, and having a coil arrangement interacting with the magnet arrangement, on a printed circuit board for fine positioning of the focus lens, with the printed circuit board being connected to the damper base by means of elastically flexible suspension means which are arranged on both sides of the longitudinal axis of the actuator, the printed circuit board being at the same time a mounting board for the lens holder, and the printed circuit board and the lens holder together forming the moving part of the actuator, wherein the magnet arrangement consists of a first partial magnet arrangement and a second partial magnet arrangement arranged so as to leave an area between them, and the lens is arranged in the area.

2. The actuator of claim 1, wherein the printed circuit board is arranged transversely with respect to the longitudinal axis of the actuator and is firmly connected, in particular soldered, to the suspension means.

3. The actuator of claim 1, wherein the actuator is symmetrical and the focus lens is arranged at the front end of the actuator.

4. The actuator of claim 1, wherein a compensating mass is connected to the printed circuit board on the side of the printed circuit board facing away from the focus lens.

5. The actuator of claim 4, wherein the compensating mass is integrally formed on the lens holder.

6. The actuator of claim 1, wherein three suspension wires each, arranged at a distance one above the other, are used as suspension means.

7. The actuator of claim 1, wherein the magnet arrangement has four permanent magnets, which are attached to a yoke firmly connected to the mount.

8. The actuator of claim 1, wherein two permanent magnets are arranged on that side of the printed circuit board which faces the damper base, and two permanent magnets are arranged on tat side of the printed circuit board which faces away from the damper base.

9. The actuator of claim 1, wherein the actuator together with an optical housing forms a scanning device which is moved along its longitudinal axis.

10. An appliance for reading from or for writing to, or for reading from and writing to, optical storage media, having an actuator according to claim 1, and a scanning device formed with the actuator.

\* \* \* \* \*